United States Patent
Austin et al.

(10) Patent No.: US 11,600,842 B2
(45) Date of Patent: Mar. 7, 2023

(54) MULTISTAGE PLUNGER PRESS SYSTEMS AND METHODS WITH INTERLOCKING FINGERS FOR FORMING BATTERY CELL TABS

(71) Applicant: GM GLOBAL TECHNOLOGY OPERATIONS LLC, Detroit, MI (US)

(72) Inventors: Alexandra J. Austin, Royal Oak, MI (US); Robert H. Dietze, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 472 days.

(21) Appl. No.: 16/819,720

(22) Filed: Mar. 16, 2020

(65) Prior Publication Data

US 2021/0283670 A1    Sep. 16, 2021

(51) Int. Cl.
*B21D 5/16* (2006.01)
*H01M 50/20* (2021.01)
(Continued)

(52) U.S. Cl.
CPC ...... *H01M 10/0404* (2013.01); *B21D 5/0209* (2013.01); *B21D 5/0281* (2013.01); *B21D 5/16* (2013.01); *H01M 10/045* (2013.01); *H01M 10/0583* (2013.01); *H01M 10/14* (2013.01); *H01M 50/20* (2021.01);
(Continued)

(58) Field of Classification Search
CPC .......... B21D 5/045; B21D 5/01; B21D 39/02; B21D 11/10; B21D 11/00; B21D 5/16; B21D 5/0209; H01M 50/503; H01M 10/0404; H01M 50/538; H01M 50/533;
(Continued)

(56) References Cited

U.S. PATENT DOCUMENTS 4,322,597 A * 3/1982 Hooke ............... H01M 50/502
                                                   219/78.16
5,023,752 A   6/1991 Defter et al.
(Continued)

FOREIGN PATENT DOCUMENTS

CN       105514498 A  * 4/2016   .......... H01M 10/058
DE     102012106157 A1   1/2014
WO    WO-2015152527 A1 * 10/2015 ............ H01M 2/024

*Primary Examiner* — Allison Bourke
*Assistant Examiner* — Kayla Elaine Clary
(74) *Attorney, Agent, or Firm* — Quinn IP Law

(57) ABSTRACT

Presented are metalworking systems for forming metallic workpieces, methods for making such workpieces and methods for operating such systems, and battery cell tabs bent by a multistage plunger press. A metalworking system includes a plunger fixture that mounts adjacent metallic workpieces, and a plunger head movably mounted to the plunger fixture to move between activated and deactivated positions. A first row of plunger fingers is mounted to the plunger head and moves in one direction to press against and bend one metallic workpiece a predefined bend angle. Likewise, a second row of plunger fingers is mounted to the plunger head and moves in an opposite direction to press against and bend another metallic workpiece another predefined bend angle. The plunger head then moves to the activated position, in tandem with the plunger fingers bending the metallic workpieces, to cause the plunger fingers to bend the workpieces additional respective bend angles.

20 Claims, 5 Drawing Sheets

(51) Int. Cl.
*H01M 10/04* (2006.01)
*H01M 10/14* (2006.01)
*H01M 50/514* (2021.01)
*H01M 50/564* (2021.01)
*H01M 50/553* (2021.01)
*B21D 5/02* (2006.01)
*H01M 10/0583* (2010.01)

(52) U.S. Cl.
CPC ....... *H01M 50/514* (2021.01); *H01M 50/553* (2021.01); *H01M 50/564* (2021.01); *Y10T 29/49108* (2015.01); *Y10T 29/49181* (2015.01)

(58) Field of Classification Search
CPC .. H01M 10/045; H01M 50/14; H01M 50/514; H01M 50/564
USPC .......................................................... 29/623
See application file for complete search history.

(56) References Cited

U.S. PATENT DOCUMENTS

| | | | |
|---|---|---|---|
| 6,103,075 | A | 8/2000 | Winsel et al. |
| 6,639,385 | B2 | 10/2003 | Verbrugge et al. |
| 6,641,942 | B1 | 11/2003 | Rouillard et al. |
| 7,109,685 | B2 | 9/2006 | Tate, Jr. et al. |
| 7,324,902 | B2 | 1/2008 | Verbrugge et al. |
| 7,373,264 | B2 | 5/2008 | Verbrugge et al. |
| 7,612,532 | B2 | 11/2009 | Verbrugge |
| 7,768,233 | B2 | 8/2010 | Lin et al. |
| 7,928,690 | B2 | 4/2011 | Koch et al. |
| 8,035,986 | B2 | 10/2011 | Koetting et al. |
| 8,054,046 | B2 | 11/2011 | Lin et al. |
| 8,108,160 | B2 | 1/2012 | Liu et al. |
| 8,170,818 | B2 | 5/2012 | Lin et al. |
| 8,198,864 | B2 | 6/2012 | Koch et al. |
| 8,212,519 | B2 | 7/2012 | Koch et al. |
| 8,321,164 | B2 | 11/2012 | Liu et al. |
| 8,581,543 | B2 | 11/2013 | Koch et al. |
| 8,645,088 | B2 | 2/2014 | Schaefer et al. |
| 8,836,280 | B2 | 9/2014 | Koch et al. |
| 9,172,118 | B2 | 10/2015 | Marsh et al. |
| 9,176,194 | B2 | 11/2015 | Meisner et al. |
| 9,178,192 | B2 | 11/2015 | Payne |
| 9,337,484 | B2 | 5/2016 | Verbrugge et al. |
| 9,354,277 | B2 | 5/2016 | Lin et al. |
| 9,461,490 | B2 | 10/2016 | Ying |
| 9,513,338 | B2 | 12/2016 | Koch et al. |
| 2003/0235736 | A1 | 12/2003 | Lin |
| 2011/0309838 | A1 | 12/2011 | Lin et al. |
| 2014/0297084 | A1 | 10/2014 | Meisner et al. |
| 2015/0017508 | A1 | 1/2015 | Khakhalev |
| 2015/0162571 | A1 | 6/2015 | Ogg et al. |
| 2015/0301116 | A1 | 10/2015 | Baker et al. |
| 2015/0318502 | A1 | 11/2015 | Kanai |
| 2016/0039419 | A1 | 2/2016 | Wampler et al. |
| 2016/0077160 | A1 | 3/2016 | Wampler, II et al. |
| 2016/0254562 | A1 | 9/2016 | Morris-Cohen et al. |
| 2016/0259011 | A1 | 9/2016 | Joe |
| 2016/0293991 | A1 | 10/2016 | Goeltz et al. |
| 2016/0336552 | A1 | 11/2016 | MacLean et al. |
| 2016/0372777 | A1 | 12/2016 | Buckley et al. |
| 2017/0077507 | A1 | 3/2017 | Harada et al. |
| 2018/0375132 | A1 | 12/2018 | Li et al. |
| 2019/0126770 | A1 | 5/2019 | Koch et al. |
| 2019/0157710 | A1 | 5/2019 | Makino et al. |
| 2020/0144582 | A1* | 5/2020 | Guo .................... B23K 26/323 |

* cited by examiner

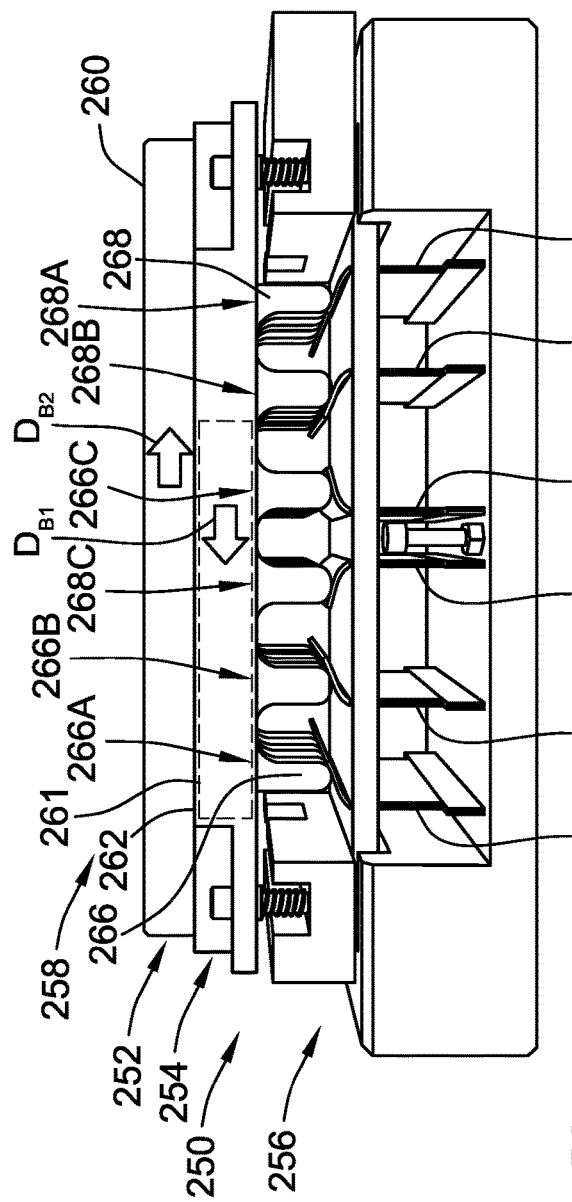
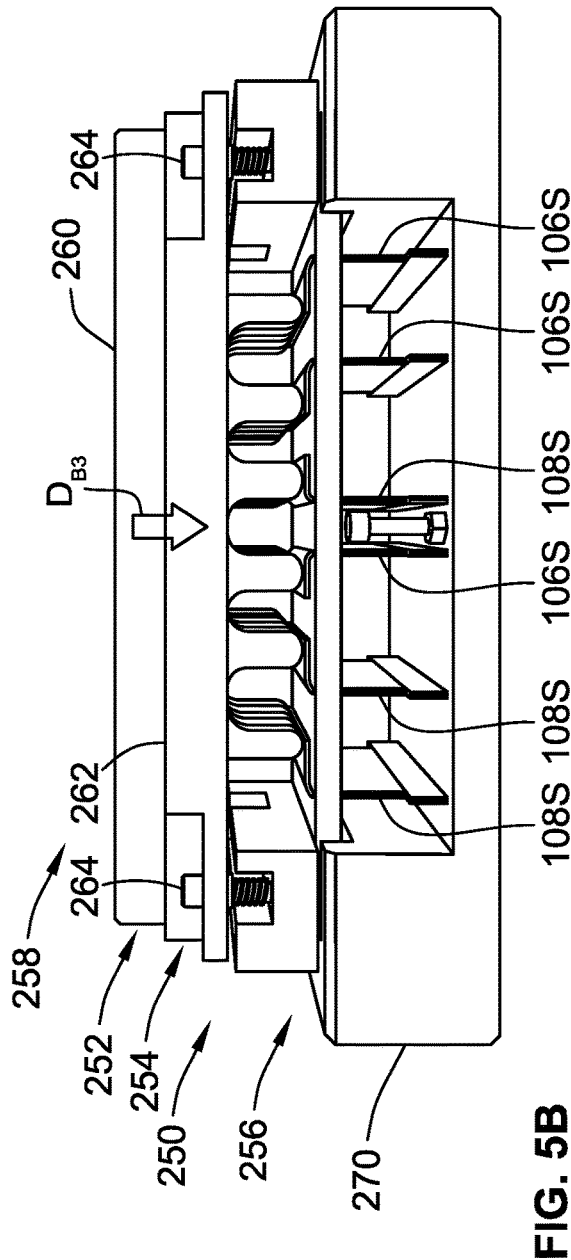
FIG. 5A
FIG. 5B

MULTISTAGE PLUNGER PRESS SYSTEMS AND METHODS WITH INTERLOCKING FINGERS FOR FORMING BATTERY CELL TABS

INTRODUCTION

The present disclosure relates generally to metalworking techniques for forming metallic workpieces. More specifically, aspects of this disclosure relate to automated press systems for bending battery cell tabs in welding operations.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Most commercially available hybrid electric and full electric vehicles employ a rechargeable traction battery pack to store and supply the requisite power for operating the powertrain's traction motor unit(s). In order to generate tractive power with sufficient vehicle range, a traction battery pack is significantly larger, more powerful, and higher in capacity (Amp-hr) than a standard 12-volt starting, lighting, and ignition (SLI) battery. Contemporary traction battery packs (also referred to as "electric vehicle battery" or "EVB") group stacks of battery cells into individual battery modules that are mounted onto the vehicle chassis, e.g., via a battery housing or support tray. Stacked electrochemical battery cells may be connected in series or parallel through use of an electrical interconnect board (ICB). The electrical tabs of the individual battery cells, which project out from the module housing, are bent against and welded to shared busbar plates. A dedicated Battery Pack Control Module (BPCM), through collaborative operation with a Powertrain Control Module (PCM), regulates the opening and closing of battery pack contactors to govern which pack or packs will power the vehicle's traction motor(s) at a given time.

SUMMARY

Presented herein are metalworking systems with attendant control logic for forming metallic workpieces, methods for making and methods for operating such systems, and traction battery packs with discrete pairs of mixed material, mixed thickness battery cell tabs bent by a multistage plunger press. By way of illustration, there are presented multistage vertical plunger press systems with interlocking plunging fingers for battery cell tab bend operations. During construction of a traction battery pack for a battery electric vehicle (BEV), for example, the individual battery pouch cells are stacked in face-to-face relation inside a battery module housing. For instance, the stacked battery cells are placed on a base plate, and subsequently covered with a module jacket bearing an integrated interconnect board (ICB) assembly. The cell tabs are contoured inside the housing and grouped together, e.g., into discrete stacks of three. These stacked cell tabs project outward from opposing ends of the battery module housing, extending through individual openings in the module jacket. In the foregoing example, a series of vertical slots may be formed into the endwalls of the module jacket, allowing the integrated ICB assembly to mount vertically onto the battery cells and comb the stacked cell tabs during ICB installation.

Once the battery module is assembled, the stacked cell tabs are bent, e.g., to a 90±5 degree (deg.) angle, into contact with ICB's electrical busbar plates; the cell tabs are thereafter welded, soldered, or clipped to the busbar plates. To provide the requisite bend, a multistage plunger press with interlocking fingers progressively bends the cell tabs into flush contact with the busbar plates. During a first plunger stage, the plunger head is aligned with one end of the battery module, and the plunger fixture is placed against the module housing such that rows of interlocking fingers projecting from the plunger head interleave with the stacked cell tabs. Distal ends of these plunger fingers are curved to help align the stacked cell tabs with the plunger head and to accommodate part-to-part variances as well as outward bowing of the terminals prior to bending. For the second plunger stage, the interlocking fingers sweep in opposing directions and press against the stacked cell tabs to provide an initial bend, e.g., of 60 to 85±5 deg. While the plunger head is in situ with the swept fingers, the fingers are translated towards the ICB and pressed into the cell tabs to provide the final bend, e.g., an additional bend of 5 to 30±5 deg., during the third plunger stage. For battery modules with mixed material, mixed thickness cell tab stacks (e.g., a copper (Cu) cathode terminal with a small-gauge thickness and an aluminum (Al) anode terminal with a large-gauge thickness), the plunger fingers may have distinct lengths to provide a larger bend for the thinner stacks and a smaller bend for the thicker stacks.

Attendant benefits for at least some of the disclosed concepts include a die forming plunger mechanism that provides for opposing bend directions of mating pairs of cell tab terminals that are welded to the same busbar plate. This, in turn, allows for a reduction in the number and size of ICB busbar plates, resulting in mass and cost savings. The plunger fingers are also able seat within small gaps between neighboring cell tab stacks to accommodate tight packaging spaces and higher-density product designs. In addition, the multistage plunging process helps to ensure a sufficient final bend for flush terminal-to-busbar engagement without placing excessive back forces on the battery module and the associated battery cells. With the foregoing features, disclosed plunger press systems, control logic, and methods accommodate differences in cell tab terminal thickness, part-to-part variances, and outwardly bowing terminals. Disclosed features may also help to minimize strain on the ICB and individual cells, and to reduce spring-back and bulging of post-bend tabs.

Presented herein are automated manufacturing systems with attendant control logic for assembling battery modules of traction battery packs. In an example, there is presented an automated or manually operated metalworking system for forming metallic workpieces (e.g., neighboring cell tab stacks). The metalworking system includes a rigid plunger fixture that mounts adjacent the metallic workpieces (e.g., seats against an endwall of a battery module housing). A plunger head is movably mounted to the plunger fixture, selectively operable to transition from a deactivated position to an activated position, and back. A sweeping and plunging (first or negative) set of mutually parallel plunger fingers is mounted to the plunger head and selectively operable to sweep in a predefined (first or rightward) bend direction to thereby press against and bend a (first or negative) metallic workpiece to an initial, predefined (first or clockwise) bend angle. Another sweeping and plunging (second or negative) set of mutually parallel plunger fingers is mounted to the plunger head and selectively operable to move in another predefined (second or leftward) bend direction to thereby press against and bend a (second or positive) metallic workpiece to another initial, predefined (second or counterclockwise) bend angle simultaneous with the bending of the other metallic workpiece. In this example, the plunger head is designed to move to the activated position, in tandem with the two sets of plunger fingers bending the metallic workpieces the initial bend angles, which causes the plunger fingers to press inward against and further bend the workpieces to respective final (third and fourth) bend angles.

Also presented herein are methods for manufacturing any of the disclosed battery modules and methods for operating any of the disclosed manufacturing systems. In an example, a method is presented for forming one or more neighboring pairs of metallic workpieces. This representative method includes, in any order and in any combination with any of the above and below disclosed options and features: mounting a plunger fixture of a plunger assembly adjacent first and second metallic workpieces, the plunger assembly including a plunger head movably mounted to the plunger fixture, and first and second sets of mutually parallel plunger fingers mounted to the plunger head; moving the first set of plunger fingers in a first bend direction to thereby press against and bend the first metallic workpiece to a first bend angle; moving the second set of plunger fingers in a second bend direction, opposite the first bend direction, to thereby press against and bend the second metallic workpiece to a second bend angle; and moving the plunger head, in tandem with the plunger fingers bending the metallic workpieces the first and second bend angles, from a deactivated position to an activated position to thereby cause the first and second sets of plunger fingers to further bend the first and second metallic workpieces to third and fourth bend angles, respectively.

For any of the disclosed systems, methods, and devices, the plunger head translates along a rectilinear plunger axis, e.g., in an up-and-down reciprocating motion towards and away from the metallic workpieces, when moving from the deactivated position to the activated position and back. In this instance, the first and second bend directions may be substantially orthogonal to the plunger axis, and in opposite directions from each other. As a further option, the first bend angle may be approximately 60-85 degrees in a clockwise direction, and the second bend angle may be approximately 60-85 degrees in a counterclockwise direction. In this regard, the third bend angle may be approximately 5-30 degrees in a clockwise direction, and the fourth bend angle may be approximately 5-30 degrees in a counterclockwise direction.

For any of the disclosed systems, methods, and devices, each set of plunger fingers may be composed of a respective row of (two, three or four) transversely spaced plunger fingers. When the plunger fingers are not bending the metallic workpieces, the respective rows of spaced plunger fingers interleave with each other and align single file in a line. Optionally, the plunger head may be a bipartite construction with a first plunger plate that is mounted on top of, and slidable with respect to, a second plunger plate. One or more spring members (e.g., helical compression springs) spring-mount the first and second plunger plates to the plunger fixture. In this example, the first set of plunger fingers may be integrally formed with the first plunger plate as a first single-piece structure, and the second set of plunger fingers may be integrally formed with the second plunger plate as a second single-piece structure. As yet a further option, the first plunger plate may include multiple elongated channels that extend therethrough; the second set of plunger fingers are slidably received in the channels and extend through the first plunger plate.

For any of the disclosed systems, methods, and devices, each plunger finger may be fabricated with an elongated body with a proximal end thereof rigidly attached to a plunger head plate, and a distal end thereof having round-chamfered corners. Optionally, the first metallic workpiece may include a discrete stack of metal tabs having a first thickness, and the second metallic workpiece may include a discrete stack of metal tabs having a second thickness smaller than the first thickness. To accommodate this thickness variance, the first set of plunger fingers bend the first metal tab stack a first bend distance, whereas the second set of plunger fingers bends the second metal tab stack a second bend distance that is greater than the first bend distance. To enable this functionality, a first length of each plunger finger in the first set of plunger fingers is shorter than a second length of each plunger finger in the second set of plunger fingers.

For any of the disclosed systems, methods, and devices, a third set of mutually parallel plunger fingers may be integrally formed with or otherwise mounted to the plunger head; these fingers are operable to move in the same bend direction as the first set to thereby press against and bend a third metallic workpiece the initial (first) bend angle. Likewise, a fourth set of mutually parallel plunger fingers may be integrally formed with or otherwise mounted to the plunger head; these fingers are operable to move in the same bend direction as the second set to thereby press against and bend a fourth metallic workpiece the second bend angle. The third and fourth sets of plunger fingers, when not bending the third and fourth metallic workpieces, are interleaved with each other and aligned in a single row.

Additional aspects of the present disclosure are directed to techniques, algorithms, and control logic for operating any of the disclosed manufacturing systems or manufacturing any of the disclosed workpieces. Aspects of the present disclosure are also directed to traction battery packs with battery pouch cells with electrically conductive cell tabs that are formed in accordance with the disclosed concepts. Also presented herein are non-transitory, computer readable media storing instructions executable by at least one of one or more processors of one or more programmable control units, such as an electronic control unit (ECU) or control module, to govern operation of any disclosed system.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIGS. 5A and 5B are perspective view illustrations of another representative multistage plunger press system for bending metallic workpieces with a first plunging stage then a first bending stage (FIG. 5A) followed by a second plunging stage (FIG. 5B) in accord with aspects of the disclosed concepts.

Figure 1:
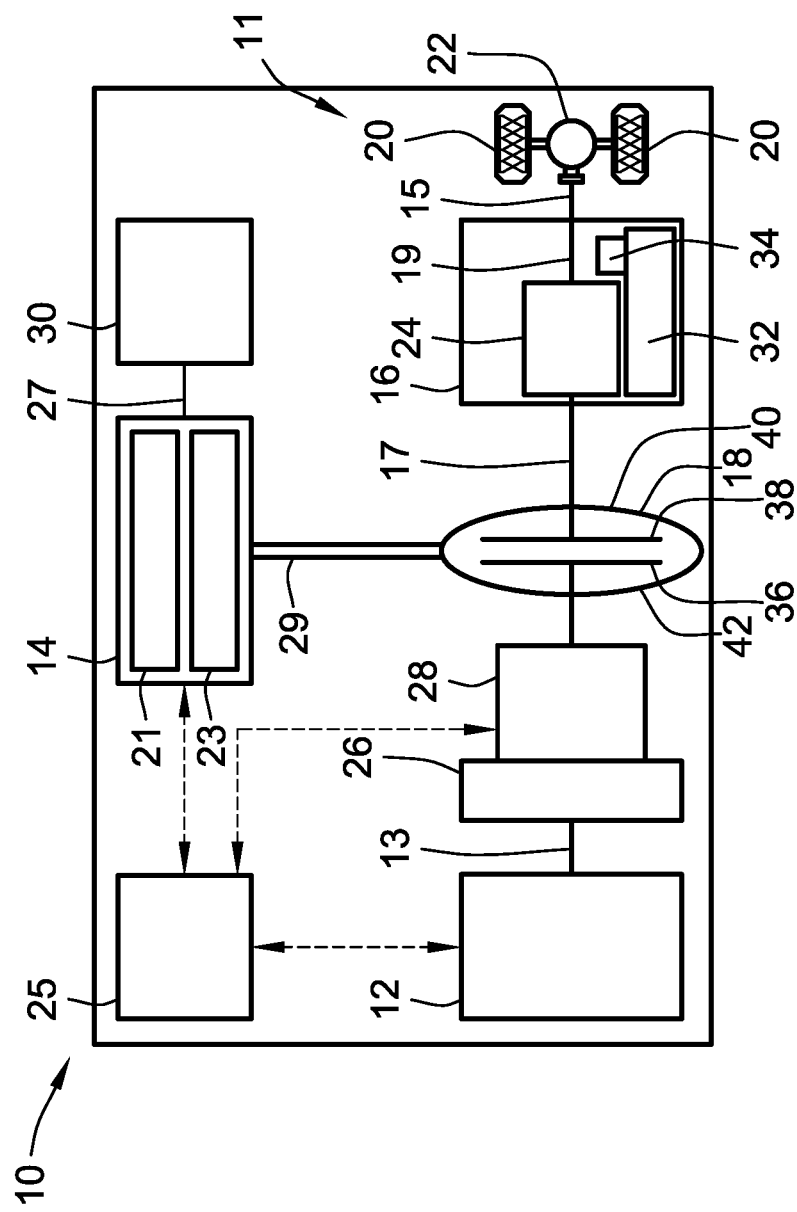
FIG. 1 is a schematic illustration of a representative electric-drive motor vehicle equipped with a hybrid powertrain having an electric traction motor powered by a rechargeable traction battery pack in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure may be practiced. In the same vein, implementation of the present concepts into a hybrid electric powertrain should also be appreciated as an exemplary application of the novel concepts disclosed herein. As such, it will be understood that facets and options of the present disclosure may be applied to other vehicle powertrain architectures, incorporated into any logically relevant type of motor vehicle, and utilized for both automotive and non-automotive applications alike. Lastly, only select components have been shown and will be described in additional detail herein. Nevertheless, the vehicles, battery modules, and manufacturing systems discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit 14—that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12, by way of the damper 26, to input structure of the TC assembly 18. As the name implies, the engine disconnect device 28 may be selectively disengaged to drivingly disconnect the engine 12 from the motor 14, TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit 14 that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled to a TC input shaft or drivingly mounted to a housing portion of the torque converter 18. The electric motor/generator unit 14 is composed of an annular stator assembly 21 circumscribing and concentric with a cylindrical rotor assembly 23. Electric power is provided to the stator 21 through electrical conductors or cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including P0, P1, P2.5, P3 and P4 hybrid powertrains, any of which may be adapted for an REV, PHEV, range-extended hybrid vehicle, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 2:
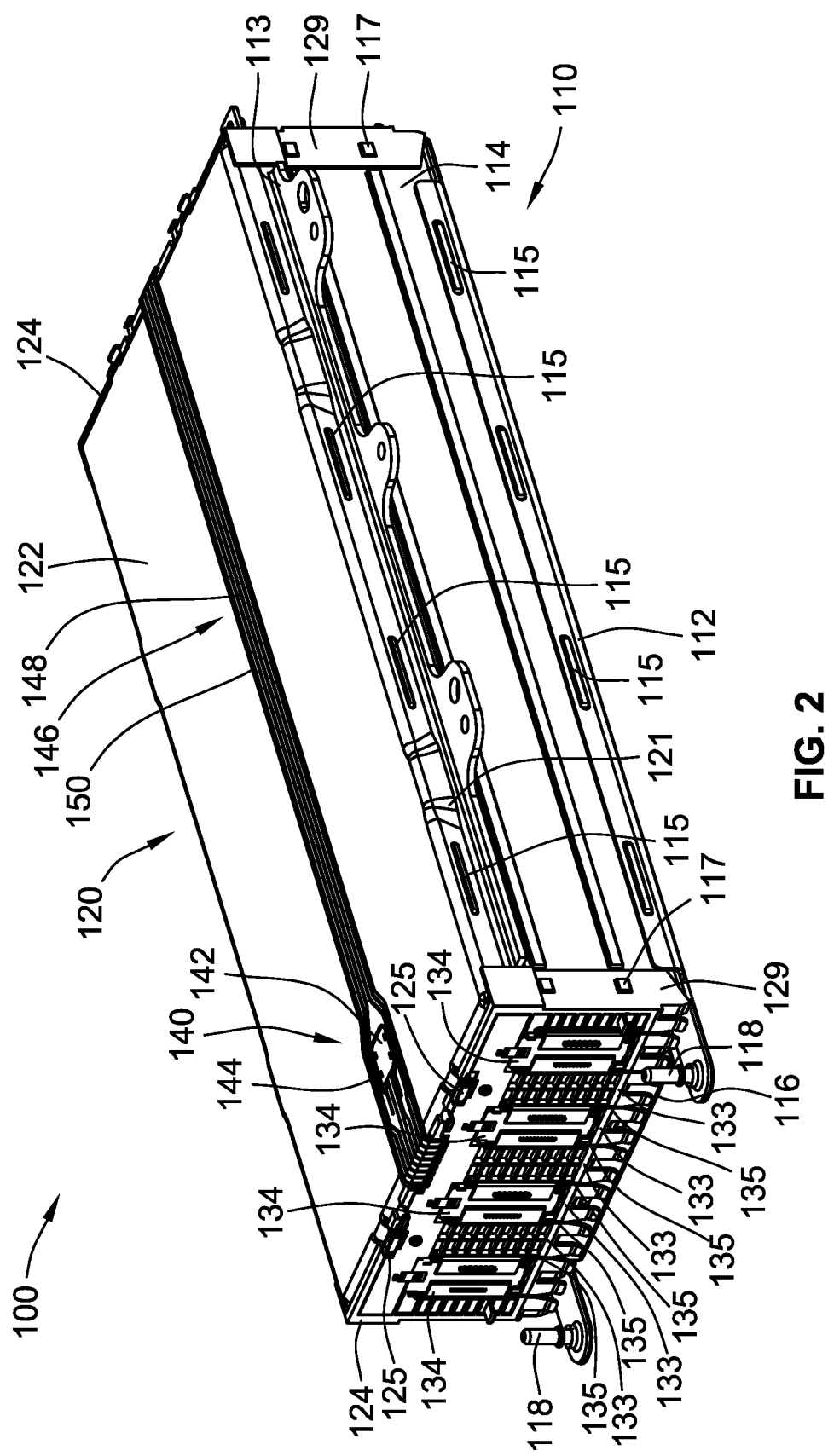
FIG. 2 is an elevated, perspective view illustration of a representative battery module with an integrated electrical ICB assembly and an internally packaged stack of battery pouch cells with cell tabs bent in accordance with aspects of the present disclosure.

Turning next to FIG. 2, there is shown a segment of a rechargeable energy storage system (RESS) that is adapted for storing and supplying high-voltage electrical energy used, for example, to propel an electric-drive vehicle, such as hybrid electric vehicle 10 of FIG. 1. This RESS may be a deep-cycle, high-ampere capacity vehicle battery system rated for approximately 350 to 800 VDC or more, for example, depending on a desired vehicle range, gross vehicle weight, and power ratings of the various accessory loads drawing electrical power from the RESS. To this end, the RESS employs one or more high-voltage, high-energy-density battery packs, such as traction battery pack 30 of FIG. 1, which is electrically connectable to one or more polyphase permanent magnet (PM) electric machines, such as traction motor 14. Each traction battery pack incorporates an aggregation (e.g., 100's or 1000's) of discrete electrochemical cells connected in series and/or parallel to achieve desired total voltage and total current requirements.

According to the representative configuration, the traction battery pack is generally composed of an array of lithium-ion battery modules, an example of which is illustrated at 100 in FIG. 2. These battery modules 100 are arranged in rows and columns, and buttressed on a battery support tray (not shown) that provides subjacent support for the battery pack during vehicle operation. Aspects of the disclosed concepts may be similarly applicable to other electric storage unit architectures, including those employing nickel metal hydride (NiMH) batteries, lead acid batteries, lithium polymer batteries, or other applicable types of rechargeable electric battery. Each battery module 100 may include a stack 102S of electrochemical battery cells, such as pouch-type lithium ion (Li-ion) or Li-ion polymer (LiPo) battery pouch cells 102 of FIG. 3, for example. For simplification of design and maintenance, and for reduction in cost and assembly time, each battery module 100 in the RESS may be substantially identical to one another.

Figure 3:
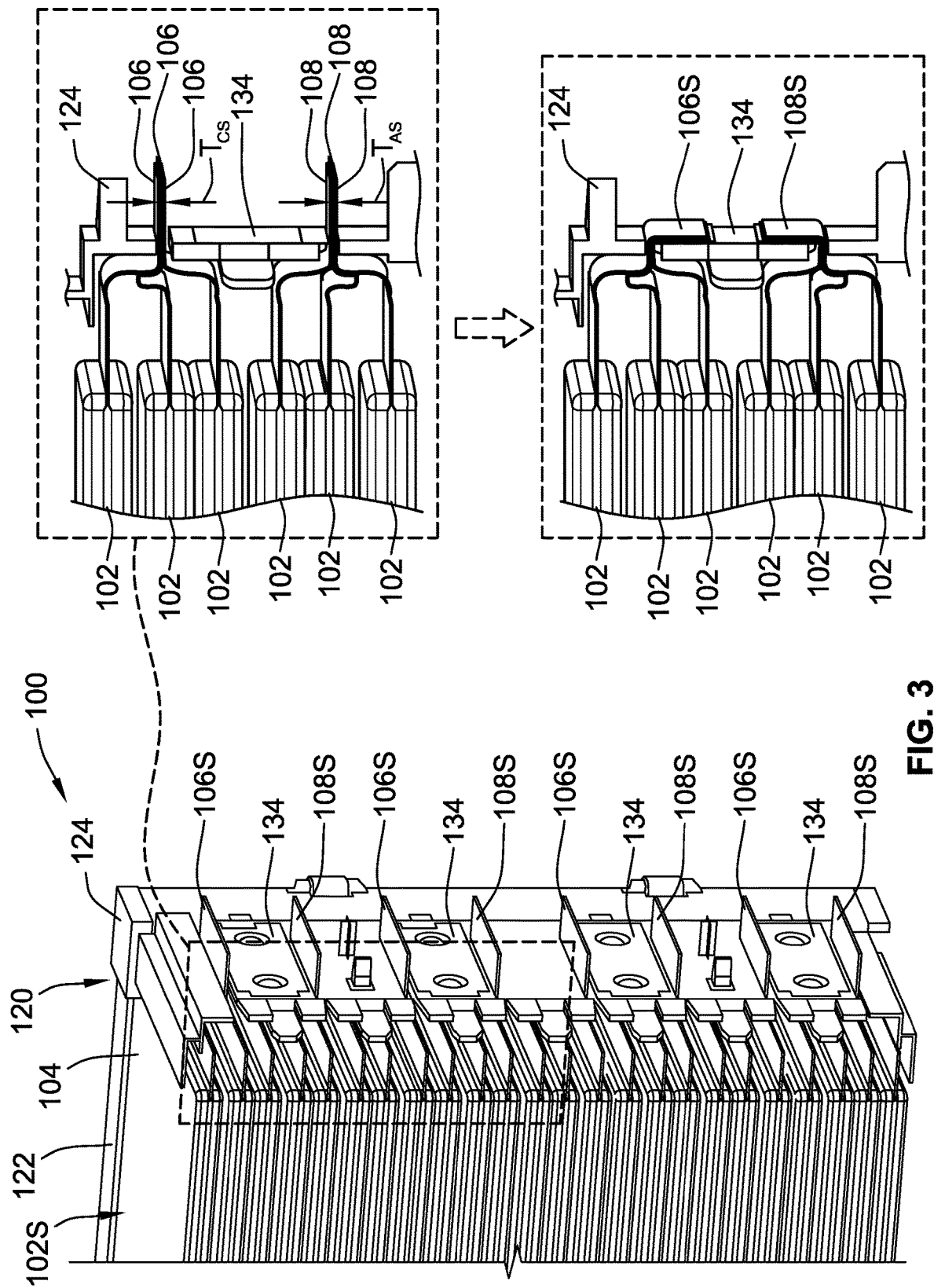
FIG. 3 is a perspective view illustration of the representative battery module of FIG. 2 with the module base plate and sidewalls removed to better illustrate the stacked battery pouch cells, and inset views showing the battery cell tabs before and after being bent in accord with aspects of the disclosed concepts.

An individual lithium-ion battery module 100 may be typified by multiple battery cells 102 (e.g., 20-30) that are stacked in side-by-side facing relation with one another and connected in parallel or series for storing and supplying electrical energy. A battery cell may be a multi-layer construction that is provided with an outer battery casing, which is represented in the drawings by an envelope-like pouch 104 (FIG. 3). The respective sides of the pouch 104 may be formed of polymer foam, aluminum sheet metal, or other suitable material. Both sides of an aluminum pouch may be coated with a polymeric material that insulates the metal from the cell elements and from any adjacent cells. These two sides are connected, e.g., via welding or crimping or other appropriate joining technique, to generally enclose therein a liquid electrolyte composition that conducts positive Lithium ions between working and reference electrodes. Extending outwardly from opposing longitudinal ends of the pouch 104 are positive (cathode) and negative (anode) electrical terminals 106 and 108, respectively, for making electrical connections with positive and negative electrodes (not visible) packaged within the internal volume of pouch 104. While shown as a silicon-based, Li-ion "pouch cell" battery, the battery cells 102 may be adapted to other constructions, including cylindrical and prismatic constructions, and may be substantially identical to one another.

With collective reference to FIGS. 2 and 3, the battery module 100 stores the electrochemical battery cells 102 inside a protective, electrically insulating battery module housing 110. Battery module housing 110 may be a rigid, multi-part construction assembled from a flanged housing base 112 with a pair of elongated module sidewalls 114 that project generally orthogonally from the base 112. Once properly arranged and mounted, the stacked battery cells 102 are supported on the housing base 112 and sandwiched between the module sidewalls 114. For ease of manufacture and assembly, the sidewalls 114 may be substantially identical to each other, both formed from a rigid plastic material with snap fastener projections 115 and 117 for operatively aligning and mechanically connecting the sidewalls 114 with the other protective exterior segments of the battery module 100. Two coplanar mounting brackets 113 extend transversely from the module housing 110, each integrally formed with and projecting at a right angle from a respective module sidewall 114.

A cooling plate 116 is mounted underneath the stacked battery cells 102, seated generally flush against the bottom surface of the housing base 112, to selectively transfer heat out of the battery module 100. This cooling plate 116 is fabricated with one or more coolant channels (not visible in the views provided) that pass therethrough a coolant fluid received via coolant ports 118. The module sidewalls 114 and cooling plate 116 may be fluidly sealed and mechanically attached to the housing base 112, e.g., via snap fasteners and a seal-forming foam. While shown with a generally rectangular-polyhedron shape, it is envisioned that the battery module housing 110 may take on other desired sizes and shapes to accommodate alternative applications with different packaging and design constraints. In the same vein, the module housing 110 may be assembled from greater or fewer segments than that which are shown in the drawings; alternatively, the housing 110 may be molded and machined as a single-piece or bipartite, unitary structure.

Operatively aligning and electrically interconnecting the battery cells 102 is an integrated interconnect board (ICB) assembly 120 that is mounted on top of the battery module housing 110. In accord with the illustrated example, the integrated ICB assembly 120 provides a protective outer jacket that is generally defined by a flanged central cover 122 with a pair of flanged endwalls 124 that project generally orthogonally from opposing ends of the central cover 122. The central cover 122 is formed from a rigid polymeric material with integral lateral flanges 121 having elongated snap fastener slots, which receive therein snap fastener projections 115 of the housing sidewalls 114. A pair of snap-in hooks 125 projects from each longitudinal end of the cover 122 and receives therein mounting pivot pins (not labelled) of the ICB endwalls 124. ICB assembly endwalls 124 may be structurally identical, both formed from a rigid polymeric material that is similar to or distinct from the polymeric material used to fabricate the ICB cover 122. Each endwall 124 is fabricated with integral mounting flanges 129 that have snap fastener holes, which receive therein snap fastener projections 117 of the housing sidewalls 114. Like the module housing 110, the ICB assembly 120 of FIGS. 2 and 3 may be assembled from greater or fewer than three protective outer segments, namely central cover 122 and endwalls 124; alternatively, the ICB assembly 120 may be molded and machined as a single-piece, unitary structure.

Each of the ICB assembly endwalls 124 is segmented into a series of elongated, mutually parallel endwall plates 133 that are arranged side-by-side in a vertical column-like fashion. These endwall plates 133 interleave with and are separated from one another by elongated slots 135. Each of the endwall plates 133 is integrally formed with a succession of flexible snap fastener tabs (not labelled) that project downwardly from a bottom edge of the endwall 124. These tabs slidably engage with and press-fit onto the cooling plate 116; in so doing, the integrated ICB assembly 120 mechanically attaches to the remainder of the battery module housing 110. In the illustrated embodiment, the ICB assembly 120 may be hermetically sealed to the module housing 110. Once the ICB assembly 120 is properly mounted, the central cover 122 is positioned in spaced facing relation to the housing base 112 with the battery cells 102 interposed between the ICB endwalls 124.

After mounting the integrated ICB assembly 120, the electrical terminals 106, 108 of the battery cells 102 are electrically connected to electrical busbar plates 134 mounted on the exterior faces of the ICB endwalls 124. As shown, each electrical busbar plate 134 is fabricated from an electrically conductive metallic material (e.g., copper) that is fashioned into a generally rectangular panel, which is then mounted on an exterior surface of one of the endwalls 124, e.g., via mounting tabs, adhesives and/or fasteners. Likewise, the electrical battery cell tabs 106, 108 are also fabricated from electrically conductive metallic materials (e.g., Al and Cu) and bent into L-shaped terminals, an exterior portion of which lays flush again and solders, welds, or clips to one of the busbar plates 134. The inset views of FIG. 3 illustrate the battery cell tabs 106, 108 prior to bending (top inset view) and after bending (bottom inset view). A pair of L-shaped inter-module bussing brackets (not labelled) are mounted on one of the ICB endwalls 124; these inter-module bussing brackets cooperatively electrically connect the battery module 100 to an adjacent battery module.

In addition to providing a protective outer jacket and electrically interconnecting the battery cells 102, the integrated ICB assembly 120 also provides sensing, operating, and electrical isolation functionalities. Such functionality may be provided by an integrated circuit (IC) sensing assembly 140 that is mounted on the central cover 122 or, for some alternative configurations, on one of the endwalls 124. The IC sensing assembly 140 is fabricated with multiple sensing devices 142, such as current, voltage, and/or temperature sensors, which are operable to sense operational characteristics of the battery cells 102. A flexible printed circuit board (PCB) 144 is shown mounted on the central cover 122, supporting thereon the sensing devices 142. A flexible electrical track 146 with multiple electrical traces 148 borne by an electrically insulating track sheet electrically connects the flexible PCB 144 and, thus, the sensing devices 142 to the battery cells 102 via the busbar connectors 134.

To electrically mate the individual battery cell tabs 106, 108 with the busbar plates 134, a multistage plunger press system 150 or 250 (also referred to herein as "metalworking system") bends the battery cell tabs 106, 108 (also referred to herein as "metallic workpieces") into abutting engagement with the busbar plates 134. While differing in appearance, it is envisioned that the features and options disclosed herein with reference to the plunger press system 150 of FIGS. 4A and 4B may be incorporated, singly or in any combination, into the example plunger press system 250 of FIGS. 5A and 5B, and vice versa. As a point of similarity, both the plunger press system 150 of FIGS. 4A and 4B and the plunger press system 250 of FIGS. 5A and 5B are generally composed of a slidably mated pair of die-forming plungers: an anode-bending or negative-tab-bending (first) plunger 152 (FIG. 4A) and 252 (FIG. 5), and a cathode-bending or positive-tab-bending (second) plunger 154 (FIG. 4B) and 254 (FIG. 5) that slides against and receives therethrough the anode-bending plunger 152, 252.

By way of demarcation, the plunger press system 150 employs five rows of plunger fingers, including three rows of interlocking fingers, designed to bend four mating pairs of battery cell tab stacks 106S, 108S at one time. Comparatively, the plunger press system 250 employs five rows of plunger fingers, including one center row of interlocking fingers, designed to bend two mating pairs of battery cell tab stacks 106S, 108S and two discrete stacks 106S, 108S at one time. In the illustrated example, a mating pair includes one stack 106S of three (3) positive battery cell tabs 106, and one stack 108S of three (3) negative battery cell tabs 108 (i.e., one pair=two stacks=six cell tabs) that are mated to the same electrical busbar plate 134. It should be appreciated that disclosed vertical plunger systems may be modified to simultaneously bend greater or fewer pairs of neighboring cell tab stacks than what is shown in the drawings, for example, to accommodate different battery module sizes and configurations.

Figure 4A:
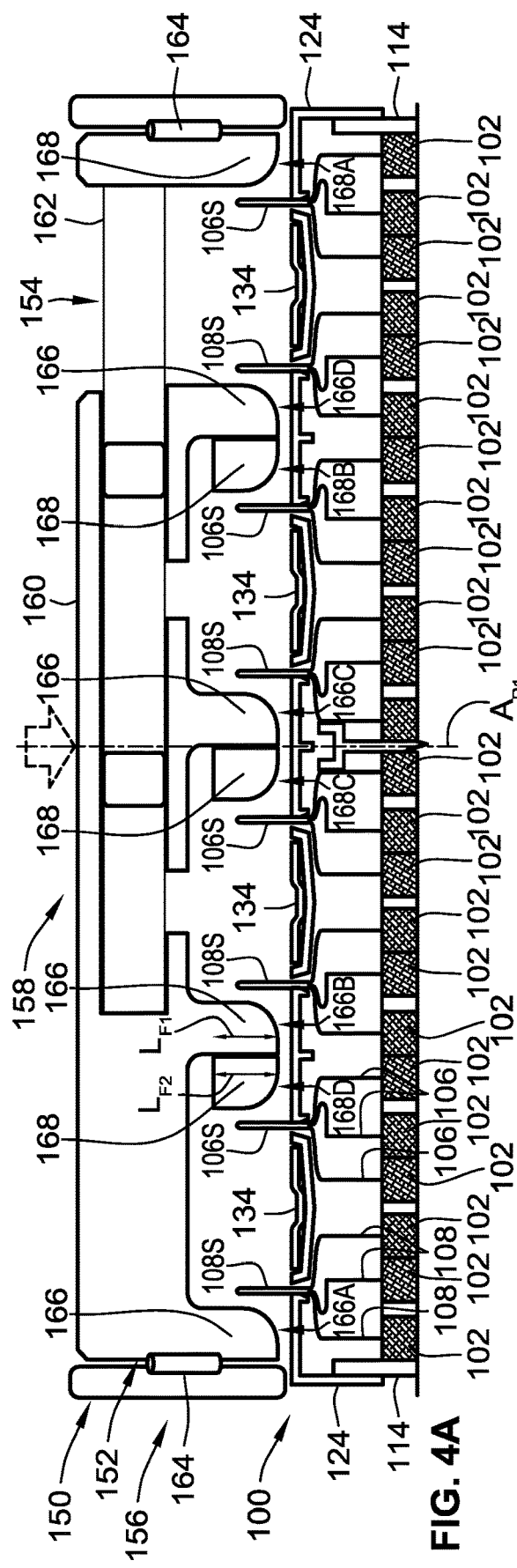
FIGS. 4A and 4B are schematic, side-view illustrations of a representative multistage plunger press system bending the battery cell tabs of FIGS. 2 and 3 with a first plunging stage (FIG. 4A) followed by a finger bending stage and then a second plunging stage (FIG. 4B) in accord with aspects of the disclosed concepts.
Figure 4B:
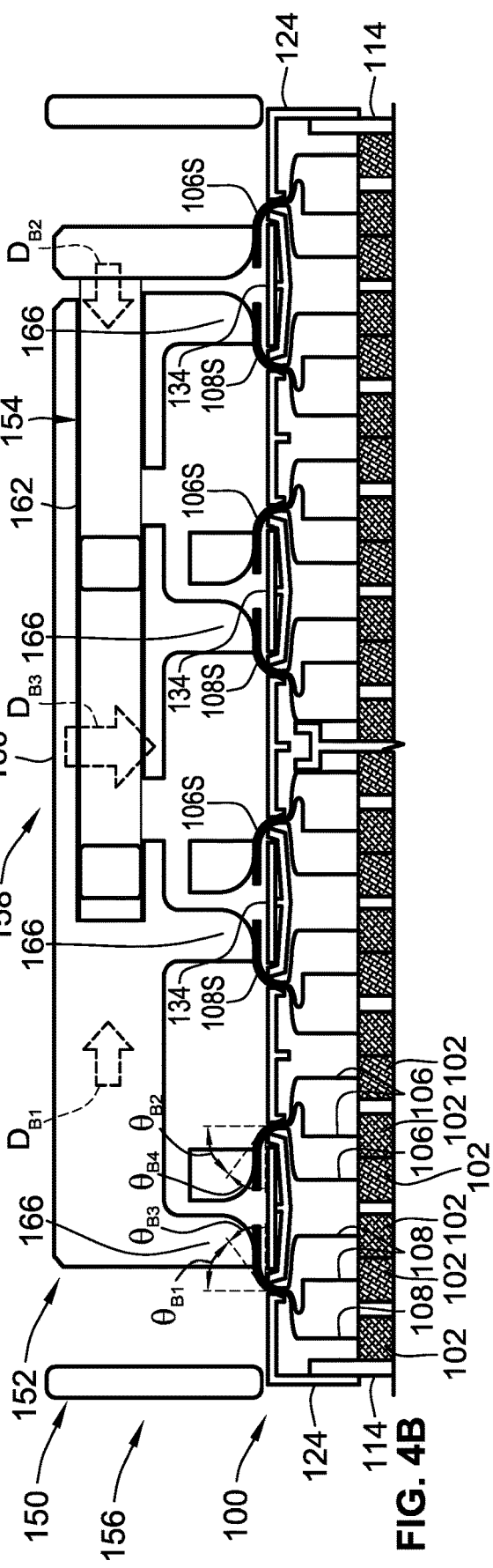

With reference to FIGS. 4A and 4B, the plunger press system 150 is generally composed of a rigid plunger fixture 156 that fixedly mounts to the battery module housing 110, seated against an endwall 124 of the ICB 120 (e.g., mating with locating features on the ICB) such that the plunger press system 150 extends over and covers the protruding metallic workpieces 106, 108. A reciprocating plunger head, which is designated generally at 158, is movably mounted onto the plunger fixture 156, located above the workpieces 106, 108. The plunger head 158 selectively transitions from a deactivated position, displaced away from the endwall 124 (vertically upwards in FIG. 4A of the drawings), to an activated position, forced towards the endwall 124 (vertically downwards in FIG. 4B the drawings). In accord with the illustrated example, the plunger head 158 is a bipartite construction that consists generally of a top (first) plunger plate 160 that seats on a bottom (second) plunger plate 162, which is slidably mounted to the first plunger plate 160. One or more spring members, which may be in the nature of four corner-mounted helical compression springs 164, spring-mount the plunger head 158—plunger plates 160, 162—to the plunger fixture 156. In so doing, the plunger head 158 translates (up-and-down in FIGS. 4A and 4B) along a rectilinear plunger axis $A_{P1}$ in a reciprocating motion towards and away from the ICB 120 and metallic workpieces 106, 108 when moving back-and-forth between the deactivated and activated positions.

Anode-bending (first/negative) plunger 152 includes or, in at least some desired configurations, consists essentially of a unitary, single-piece structure with a distributed (first) array of mutually parallel plunger fingers—four plunger finger rows 166A-166D arranged in a rectangular array—that are integrally formed with the plunger plate 160. While not per se limited, each plunger (first, second, third, and fourth) finger row 166A-166D contains two or more discrete plunger fingers 166 (e.g., two per row in FIGS. 4A and B; three per row in FIGS. 5A and 5B) that are transversely spaced from each other. Additionally, each plunger finger 166 in the first array of plunger fingers has an elongated body with a distal (bottom) end thereof having a rounded (rightward-facing) corner. These plunger finger rows 166A-166D project generally orthogonally from the plunger plate 160 and are spaced from one another along the plunger plate's 160 length (from left-to-right in FIGS. 4A and 4B). It should be appreciated that the number, geometry and orientation of the plunger fingers 166 and/or plunger finger row 166A-166D may be varied from that which are shown in the drawings.

Cathode-bending (second/positive) plunger 154, like the anode-bending plunger 152, includes or, in at least some desired configurations, consists essentially of a unitary, single-piece structure with a distributed (second) array of mutually parallel plunger fingers—four plunger finger rows 168A-168D arranged in a rectangular array—that are integrally formed with the plunger plate 162. As shown, each (fifth, sixth, seventh, and eighth) plunger finger row 168A-168D contains two or more discrete plunger fingers 168 (e.g., two per row in FIGS. 4A and B). Additionally, each plunger finger 168 in the second array of plunger fingers has an elongated body with a distal (bottom) end thereof having a rounded (leftward-facing) corner. The plunger finger rows 168A-168D of plunger 154 project generally orthogonally from the plunger plate 162 and are spaced from one another along the plunger plate's 162 length (from right-to-left in FIGS. 4A and 4B). As indicated above, the number, geometry and orientation of the plunger fingers 168 and/or plunger finger row 168A-168D may be modified to suit alternative battery module architectures.

To simultaneously bend the mating pair or pairs of cell tab stacks 106S, 108S, the multistage vertical plunger press system 150 performs a predefined sequence of processing steps. During a first plunger stage, the plunger fixture 156 is mounted to one end of the battery module 100 such that the plunger head 158 operatively aligns with the ICB endwall 124 and the plunger finger rows 166A-166D and 168A-168D interleave between the protruding battery cell tab stacks 106S, 108S, as seen in FIG. 4A. The curved distal ends of the plunger fingers 166, 168 may slide against the cell tabs 106, 108 and thereby align the tabs 106, 108 with the plunger head 158; this, in turn, helps to accommodate part-to-part variances between individual battery modules as well as inadvertent bowing of the protruding cell tabs. At this stage, i.e., prior to bending any of the metallic workpieces 106S, 108S, one or more rows of plunger fingers 166A-166D of the anode-bending plunger 152 interleave with and/or abut against one or more rows of plunger fingers 168A-168D of the cathode-bending plunger 154 and align single file. As best seen in FIG. 4B, for example, the fingers 166 in the second, third and fourth rows 166B, 166C, 166D partially interleave with—in an alternating fashion—the fingers 168 in the fourth, third and second rows 166B, 166C, 166D, respectively.

Once the plunger fixture 156 is securely mounted to the battery module 100 and the plunger head 158 is properly aligned, the plunger fingers 166, 168 sweep in opposite directions and concomitantly press against and bend the stacked cell tabs 106S, 108S, as part of a second plunger stage. With reference again to FIG. 4B, for example, the four rows 166A-166D of plunger fingers 166 projecting from the plunger plate 160 and located immediately adjacent respective negative (anode) cell stacks 108S translate in a rightward (first bend) direction DBI, e.g., under the driving force of a stepper motor, linear actuator, hydraulic or pneumatic cylinder, etc. In doing so, the fingers 166 are forced against and simultaneously bow these workpieces 108 an initial (first) bend angle $\theta_{B1}$, e.g., of approximately 60-85±5 degrees in a clockwise direction. Conversely, the four rows 168A-168D of plunger fingers 168 projecting from the plunger plate 162 and located immediately adjacent respective positive (cathode) cell stacks 106S, translate in a leftward (second bend) direction $D_{B2}$ via a suitable driving mechanism. In this manner, the fingers 168 are forced against and simultaneously bow these workpieces 106 an initial (second) bend angle $\theta_{B2}$, e.g., of approximately 60-85±5 degrees in a counterclockwise direction. In accord with the illustrated example, the bend directions $D_{B1}$, $D_{B2}$ are along rectilinear (horizontal) paths that are substantially orthogonal to the plunger head's 158 (vertical) axis $A_{P1}$ and in opposite directions from each other.

Upon completion of the initial cell tab bends carried out in the second plunger stage, the plunger press system 150 sequentially executes a third plunger stage whereat the plunger head 158 is urged to the activated position in tandem with the plunger fingers 166, 168 bending the workpieces 106S, 108S their initial bend angles $\theta_{B1}$, $\theta_{B2}$. Put another way, during the downward stroke $D_{B3}$ of the plunger head's 158 reciprocating linear motion, the plunger fingers 166, 168 are retained in situ and, thus, are holding the cell tab stacks 106S, 108S at an oblique bend angle. By driving the plunger head 158 downwards, e.g., via a suitable die press actuator, the plunger fingers 166, 168 are concomitantly driven towards the ICB endwall 124 and bend the workpieces 106S, 108S final bend angles $\theta_{B3}$ and $\theta_{B4}$, respectively, into substantially flush contact with the busbar plates 134. For at least some implementations, the final (third) bend angle $\theta_{B3}$ applied by the distal tips of plunger fingers 166 is approximately 5-30±5 degrees in a clockwise direction, whereas the final (fourth) bend angle $\theta_{B4}$ applied by the distal tips of plunger fingers 168 is approximately 5-30±5 degrees in a counterclockwise direction. The plunger head 158 thereafter returns to the deactivated position (FIG. 4A) and the plunger finger rows 166A-D, 168A-D slide back to their respective start positions allowing for welding of the tabs 106, 108 to the plates 134.

As indicated above, each stack 108S of aluminum anode tabs 108 has a top-face to bottom-face (first) stack thickness TAS (FIG. 3), e.g., of about 0.4 mm, whereas each stack 106S of copper cathode tabs 106 may have a distinct top-face to bottom-face (second) stack thickness $T_{CS}$, e.g., of about 0.2 mm, due to larger gauge requirements for aluminum terminals to maintain an equivalent current capacity with their mating copper terminals (Cu is more conductive than Al). In such cases, the anode-bending plunger 152 may be configured to bend the stacks 108S a shorter distance than that imparted by the cathode-bending plunger 154 on the stack 106S. By way of non-limiting example, the plunger fingers 166 bend the anode tab stack 108S a shorter (first) total bend distance, and the plunger fingers 168 bend the cathode tab stack 106S a longer (second) total bend distance that is greater than the total bend distance imparted to the negative tabs 106. To achieve this feature, a relative (first) functional length $L_{F1}$ (FIG. 4A) of each plunger finger 166 in the rows 166A-D of plunger fingers 166 is shorter than a relative (second) functional length $L_{F2}$ (FIG. 4A) of each plunger finger 168 in the rows 168A-D of plunger fingers 168. In so doing, there is a larger gap distance between the plunger fingers 166 and the ICB endwall 124 in FIGS. 4A and 4B for the cell tab stack 108S than on the gap distance of plunger fingers 168 for the cell tab stack 106S.

Turning next to FIGS. 5A and 5B, wherein like reference numbers are used to denote similar parts to those discussed above in FIGS. 4A and 4B, the multistage (vertical) plunger press system 250 also includes an anode-bending plunger 252 that sits on top of and slides against a cathode-bending plunger 254. A rigid plunger fixture 256 fixedly mounts to the battery module housing 110 or, as shown, a test stand 270, and seats against an endwall 124 of the ICB 120 or, as shown, an interior platform 272. The test stand 270 and interior platform 272 may be provided for additional stability or, alternatively, may be removed altogether from the embodiment of FIGS. 5A and 5B. A reciprocating plunger head 258 is movably mounted onto the plunger fixture 256, located above the workpieces 106, 108. Similar to the plunger head 158 of FIGS. 4A and 4B, the plunger head 258 is a bipartite construction that includes a top (first) plunger plate 260 that seats on a bottom (second) plunger plate 262, which is slidably mounted to the first plunger plate 260. Four vertically oriented helical compression springs 264 located at the four corners of the plunger head 258 spring-mount the plunger plates 260, 262 to the plunger fixture 256.

The anode-bending plunger 252 includes or, as shown, consists essentially of a unitary, single-piece structure with an array of mutually parallel plunger fingers—three rows 266A-266C of elongated plunger fingers 266 arranged in a rectangular array—that are integrally formed with the plunger plate 260. In the same vein, the cathode-bending plunger 252 includes or, as shown, consists essentially of a unitary, single-piece structure with an array of mutually parallel plunger fingers—three rows 268A-268C of elongated plunger fingers 268 arranged in a rectangular array— that are integrally formed with the plunger plate 262. The plunger plate 262 is manufactured with multiple elongated channels (shown schematically at 261) that extend through the plate 260; the plunger fingers 266 are slidably received in these channels 261, extending through the plunger plate 260.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A metalworking system for forming a first metallic workpiece and a second metallic workpiece, the metalworking system comprising:
    a plunger fixture configured to mount adjacent the first metallic workpiece and the second metallic workpiece;
    a plunger head movably mounted to the plunger fixture and configured to transition between a deactivated position and an activated position, the plunger head including a first plunger plate, a second plunger plate slidably mounted to the first plunger plate, and a spring member spring-mounting the first plunger plate and the second plunger plate to the plunger fixture;
    a first set of plunger fingers mounted to the first plunger plate of the plunger head and configured to move in a first bend direction to thereby press against and bend the first metallic workpiece to a first bend angle; and
    a second set of plunger fingers mounted to the second plunger plate of the plunger head and configured to move in a second bend direction, opposite the first bend direction, to thereby press against and bend the second metallic workpiece to a second bend angle,
    wherein the plunger head is configured to move to the activated position, in tandem with the first set of plunger fingers and the second set of plunger fingers bending the first metallic workpiece and the second metallic workpiece to the first bend angle and the second bend angle, respectively, to thereby cause the first set of plunger fingers and the second set of plunger fingers to bend the first metallic workpiece and the second metallic workpiece to a third bend angle and a fourth bend angle, respectively.

2. The metalworking system of claim 1, wherein the plunger head is config ured to translate along a plunger axis in a reciprocating motion towards and away from the first metallic workpiece and the second metallic workpiece when moving between the deactivated and activated positions.

3. The metalworking system of claim 2, wherein the first bend direction and the second bend direction are substantially orthogonal to the plunger axis and in opposite directions from each other.

4. The metalworking system of claim 1, wherein the first bend angle is approximately 60-85 degrees in a clockwise direction, and the second bend angle is approximately 60-85 degrees in a counterclockwise direction.

5. The metalworking system of claim 4, wherein the third bend angle is approximately 5-30 degrees in a clockwise direction, and the fourth bend angle is approximately 5-30 degrees in a counterclockwise direction.

6. The metalworking system of claim 1, wherein the first set of plunger fingers includes a first row of spaced mutually parallel plunger fingers, and the second set of plunger fingers includes a second row of spaced mutually parallel plunger fingers, wherein the first row and the second row of spaced mutually parallel plunger fingers interleave with each other and align single file when not bending the first metallic workpiece and the second metallic workpiece.

7. A metalworking system for forming a first set of metallic workpieces and a second set of multiple metallic workpieces, the metalworking system comprising:
    a plunger fixture configured to mount adjacent the first set of metallic workpieces and the second set of metallic workpieces;
    a plunger head movably mounted to the plunger fixture and configured to transition between a deactivated position and an activated position;
    a first set of plunger fingers mounted to the plunger head and configured to move in a first bend direction to thereby press against and bend the first set of metallic workpieces to a first bend angle; and
    a second set of plunger fingers mounted to the plunger head and configured to move in a second bend direction, opposite the first bend direction, to thereby press against and bend the second set of metallic workpieces to a second bend angle, wherein a first length of each plunger finger in the first set of plunger fingers is shorter than a second length of each plunger finger in the second set of plunger fingers such that the first set of plunger fingers bends the first set of metallic workpieces a first bend distance and the second set of plunger fingers bends the second set of metallic workpieces a second bend distance greater than the first bend distance, wherein the plunger head is configured to move to the activated position, in tandem with the first and second sets of plunger fingers bending the first set of metallic workpieces and the second set of metallic workpieces to the first bend angle and second bend angle, respectively, to thereby cause the first set of plunger fingers and second set of plunger fingers to bend the first set of metallic workpieces and the second set of metallic workpieces to a third bend angle and a fourth bend angle, respectively.

8. The metalworking system of claim 1, wherein the first set of plunger fingers is integrally formed with the first plunger plate as a first single-piece structure, and the second set of plunger fingers is integrally formed with the second plunger plate as a second single-piece structure.

9. The metalworking system of claim 8, wherein the first plunger plate defines therethrough a plurality of elongated channels, and wherein the second set of plunger fingers is slidably received in the plurality of elongated channels and extends through the first plunger plate.

10. The metalworking system of claim 1, wherein each plunger finger in the first set of plunger fingers and the second set of plunger fingers has an elongated body with a distal end thereof having rounded corners.

11. The metalworking system of claim 1, wherein the first metallic workpiece includes a first metal tab stack having a first thickness, and the second metallic workpiece includes a second metal tab stack having a second thickness smaller than the first thickness, and wherein the first set of plunger fingers is configured to bend the first metal tab stack a first bend distance, and the second set of plunger fingers is configured to bend the second metal tab stack a second bend distance greater than the first bend distance.

12. The metalworking system of claim 1, further comprising:
a third set of mutually parallel plunger fingers mounted to the plunger head and configured to move in the first bend direction to thereby press against and bend a third metallic workpiece the first bend angle; and
a fourth set of mutually parallel plunger fingers mounted to the plunger head and configured to move in the second bend direction to thereby press against and bend a fourth metallic workpiece the second bend angle.

13. The metalworking system of claim 7, wherein the plunger head includes a first plunger plate, a second plunger plate slidably mounted to the first plunger plate, and a spring member spring-mounting the first plunger plate and second plunger plate to the plunger fixture.

14. The metalworking system of claim 12, wherein the third and fourth sets of plunger fingers are interleaved with each other and aligned in a single row when not bending the third metallic workpiece and fourth metallic workpiece.

15. A method for forming a first metallic workpiece and a second metallic workpiece, the method comprising:
mounting a plunger fixture of a plunger assembly adjacent the first metallic workpiece and the second metallic workpiece, the plunger assembly including a plunger head movably mounted to the plunger fixture, and a first set of plunger fingers and a second set of plunger fingers mounted to the plunger head, the plunger head including a first plunger plate slidably mounted to a second plunger plate, and a spring member spring-mounting the first plunger plate and the second plunger plate to the plunger fixture;
moving the first set of plunger fingers in a first bend direction to thereby press against and bend the first metallic workpiece to a first bend angle;
moving the second set of plunger fingers in a second bend direction, opposite the first bend direction, to thereby press against and bend the second metallic workpiece to a second bend angle; and
moving the plunger head, in tandem with the first set of plunger fingers and the second set of plunger fingers bending the first metallic workpiece and the second metallic workpiece the first bend angle and second bend angle, respectively, from a deactivated position to an activated position to thereby cause the first set of plunger fingers and the second set of plunger fingers to further bend the first metallic workpiece and the second metallic workpiece a third bend angle and a fourth bend angle, respectively.

16. The method of claim 15, wherein the plunger head is configured to move along a rectilinear plunger axis in a reciprocating motion towards and away from the first metallic workpiece and second metallic workpiece when moving between the deactivated and activated positions, and wherein the first bend direction and the second bend directions are substantially orthogonal to the plunger axis and in opposite directions from each other.

17. The method of claim 15, wherein the first bend angle is approximately 60-85 degrees in a clockwise direction, the second bend angle is approximately 60-85 degrees in a counterclockwise direction, the third bend angle is approximately 5-30 degrees in a clockwise direction, and the fourth bend angle is approximately 5-30 degrees in a counterclockwise direction.

18. The method of claim 15, wherein the first set of plunger fingers includes a first row of spaced mutually parallel plunger fingers, and the second set of plunger fingers includes a second row of spaced mutually parallel plunger fingers, wherein the first row of spaced mutually parallel plunger fingers and the second row of spaced mutually parallel plunger fingers interleave with each other and align single file when not bending the metallic workpieces.

19. The method of claim 15, wherein the first set of plunger fingers is mounted to the plunger head via the first plunger plate, the second set of plunger fingers is mounted to the plunger head via the second plunger plate, and the second plunger plate is slidably mounted on the first plunger plate.

20. The method of claim 15, wherein the first set of plunger fingers is integrally formed with the first plunger plate as a first single-piece structure, and the second set of plunger fingers is integrally formed with the second plunger plate as a second single-piece structure.

* * * * *